United States Patent
Cogburn

(10) Patent No.: US 11,672,238 B2
(45) Date of Patent: Jun. 13, 2023

(54) SYSTEM AND METHOD FOR PRESERVING CRUSTACEANS

(71) Applicant: Boyd's Seafood, Inc., Hitchcock, TX (US)

(72) Inventor: Jason Andrew Cogburn, Santa Fe, TX (US)

(73) Assignee: BOYD'S SEAFOOD, INC., Hitchcock, TX (US)

(*) Notice: Subject to any disclaimer, the term of this patent is extended or adjusted under 35 U.S.C. 154(b) by 0 days.

(21) Appl. No.: 17/200,340

(22) Filed: Mar. 12, 2021

(65) Prior Publication Data
US 2021/0282377 A1  Sep. 16, 2021

Related U.S. Application Data

(60) Provisional application No. 62/988,747, filed on Mar. 12, 2020.

(51) Int. Cl.
*A01K 61/59* (2017.01)
*A01K 63/02* (2006.01)
*A01K 63/06* (2006.01)

(52) U.S. Cl.
CPC .......... *A01K 61/59* (2017.01); *A01K 63/02* (2013.01); *A01K 63/065* (2013.01)

(58) Field of Classification Search
USPC ....... 119/214, 200, 201, 204, 232, 245, 248, 119/249, 250, 251
See application file for complete search history.

(56) References Cited

U.S. PATENT DOCUMENTS

| | | | | |
|---|---|---|---|---|
| 2,594,474 A | * | 4/1952 | McGrath | A01K 63/065 62/319 |
| 2,672,845 A | * | 3/1954 | Schneithorst | A01K 63/006 62/319 |
| 2,981,228 A | * | 4/1961 | Brandano | A01K 63/003 119/214 |
| 3,727,579 A | * | 4/1973 | Lee | A01K 63/00 119/201 |
| 4,089,298 A | * | 5/1978 | Wilson | A01K 63/02 119/201 |
| 4,155,331 A | * | 5/1979 | Lawrence | A01N 1/02 119/214 |
| 5,377,622 A | * | 1/1995 | Lauttenbach | A01K 63/00 119/200 |
| 7,087,257 B1 | * | 8/2006 | Prestenbach | A23L 17/40 426/643 |
| 2009/0250010 A1 | * | 10/2009 | Urusova | A23B 4/20 119/214 |
| 2010/0170450 A1 | * | 7/2010 | Bradley | A01K 63/042 119/261 |

FOREIGN PATENT DOCUMENTS

| CN | 208233773 | * 12/2018 | ............. B65D 81/18 |
|---|---|---|---|
| ES | 2610822 | * 5/2017 | ............. A22C 29/02 |

\* cited by examiner

*Primary Examiner* — Andrea M Valenti
(74) *Attorney, Agent, or Firm* — Alexander B. Uber; Gray Reed

(57) ABSTRACT

A system and method for the long-term preservation of crustaceans, particularly crawfish. Certain embodiments sort quantities of live crawfish into tightly-packaged bags for rapid freezing to minimize damage to the crawfish and enhance the effectiveness of the preservation process.

17 Claims, 9 Drawing Sheets

SYSTEM AND METHOD FOR PRESERVING CRUSTACEANS

CITATION TO PRIOR APPLICATIONS

The present application is a continuation of and claims priority to U.S. Provisional Application No. 62/988,747, titled "SYSTEM AND METHOD FOR PRESERVING CRUSTACEANS" and filed Mar. 12, 2020.

BACKGROUND OF THE INVENTION

The present invention relates generally to the preparation of live crustaceans for long-term preservation, storage, and transportation.

While the crawfish season typically lasts between 6-7 months every year, a majority of the crawfish (60-70%) is often captured in a period of 45-90 days. Of this amount, at least 70% is captured within a 30-40 day period. Fresh, living crawfish can be kept alive or sustained for at best 120 hours after capture. For this reason, a supply of fresh crawfish is extremely limited for most of the season. Furthermore, during the 30-40 day period in which the majority of live crawfish are captured, the supply of live crawfish exceeds the practically serviceable demand. As a result, the live crawfish market becomes extremely saturated for approximately 50-80 days and farming thereafter become unsustainable as value for quantities of live crawfish decline during this period of overabundance. This, in turn, has caused crawfish farms to exit the market and halt operations leading to industry-wide job loss as prices for live crawfish plummet during this period. Additionally, as price wars break out among distributors, levels of spoilage and waste of crawfish supplies rises—in part because of lost sales and a lack of care in the proper, consistent handling, and thorough sorting, of the crawfish in efforts to curb costs in light of the market saturation, falling profits, and increasingly unaffordable labor expenses.

Additionally, when domestic demand exceeds the domestic supply (particularly in periods outside the 45-90 day window previously discussed), foreign crawfish supplies are called upon to satisfy that demand. The ability to satisfy demand, however, is still limited as practical considerations, such as shelf life, eliminate certain modes of transport including by truck or by rail. Restrictions on trucking drive times and regulations from harvesting regions further complicate matters. As a result, distributors must often rely on expensive transport by flight.

In efforts to satisfy the demand for crawfish, methods of preservation have been developed. Despite these efforts, currently known and utilized methodologies to preserve crawfish result in degradation of crawfish quality and flavor. For this reason, demand for live crawfish, or at least for crawfish maintaining the same level of quality and flavor as that of live crawfish, still goes unfulfilled for most of the year (including during crawfish season itself).

Furthermore, such prior art methodologies directed to preservation of crawfish involve freezing and that the crawfish be partially cooked before freezing—typically through parboiling. As indicated previously, such methodologies result in substantial loss in quality and flavor.

SUMMARY OF THE INVENTION

Embodiments of the present invention are directed to systems and methods of preserving crustaceans. As compared to prior art approaches, practice of such embodiments is designed to resolve or otherwise address the various concerns and issues identified above.

Embodiments of the present invention utilizing such an improved method of preserving crustaceans eliminate the necessity of partially cooking crustaceans, through parboiling or other techniques, prior to freezing thereby reducing cost and time spent in the preservation process as well as avoiding any regulations associated with the cooking of such crustaceans.

Crawfish preserved in accordance with embodiments of the present invention have an effective shelf life of at least eighteen (18) months. Such crawfish additionally maintain an improved quality relative to those crawfish preserved using prior art methodologies.

Practitioners of embodiments of the present invention will be capable of long-term preservation of crawfish stocks thereby alleviating much of the pressure from market forces currently experienced during the crawfish season, stimulating competition, and allowing for sale of viable crawfish outside of the crawfish season. Furthermore, the present methodology would allow for maximizing retention of peak quality crawfish catches that occur in a narrow 30-45 day window of the crawfish season.

DETAILED DESCRIPTION

This description, with references to the figures, presents non-limiting examples of embodiments of the present invention.

Certain embodiments of the present invention comprise a quantity of crustaceans wherein said crustaceans may be live crawfish. These crawfish may be captured through means or practices known in the art.

Figure 1:
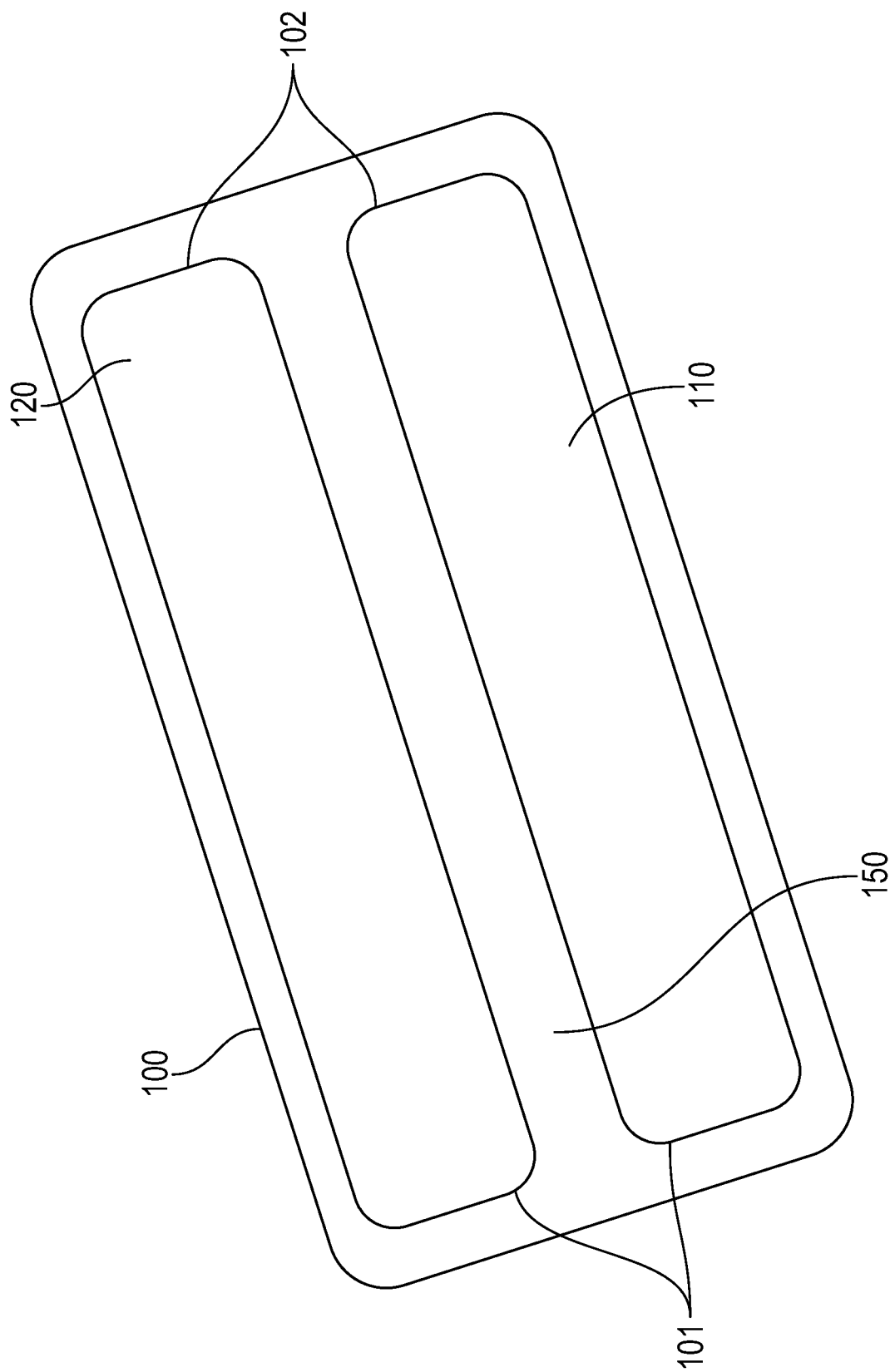
FIG. 1 is a top view of a preservation container in accordance with embodiments of the present disclosure.
Figure 2:
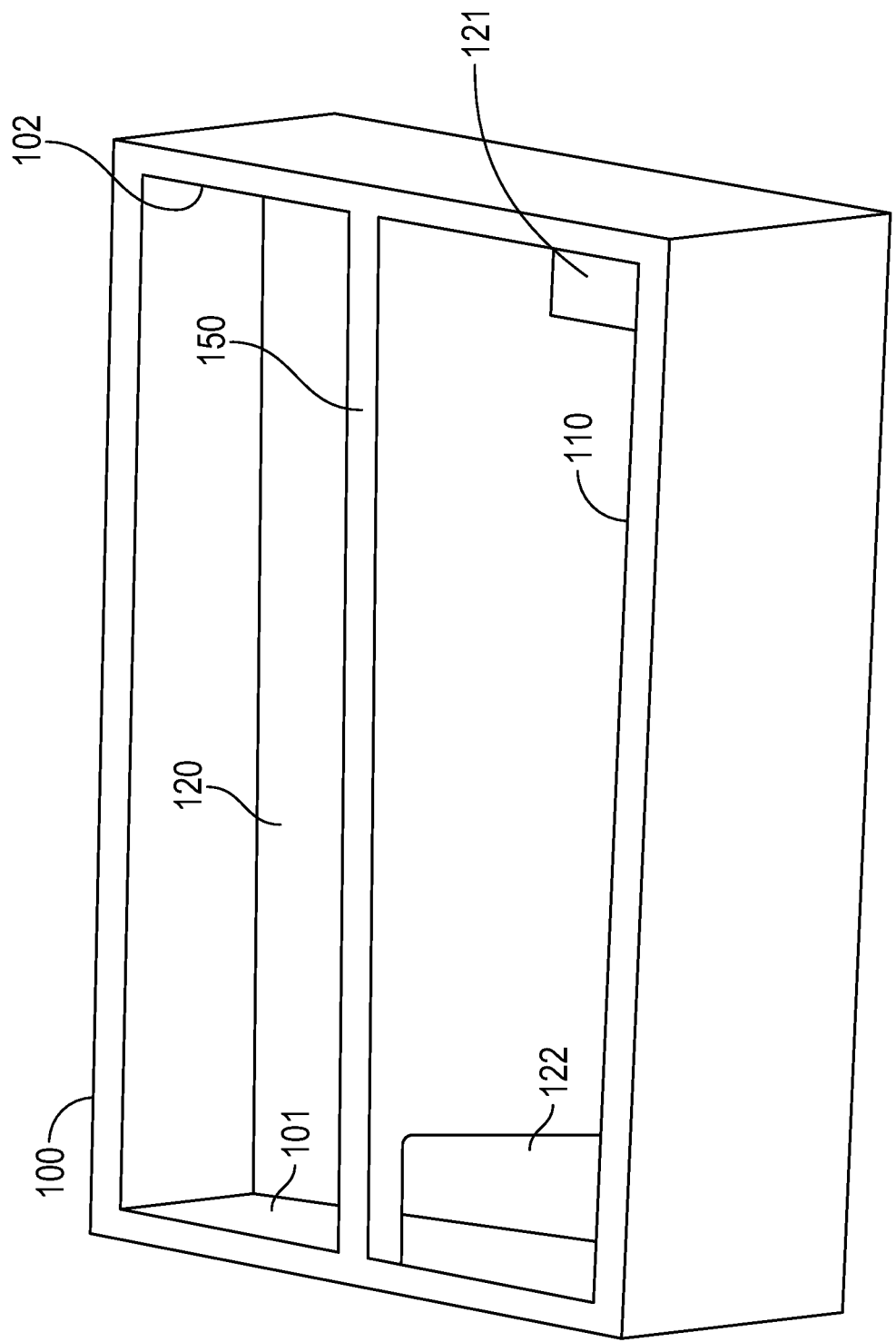
FIG. 2 is a right perspective view of a preservation container in accordance with embodiments of the present disclosure.
Figure 3:
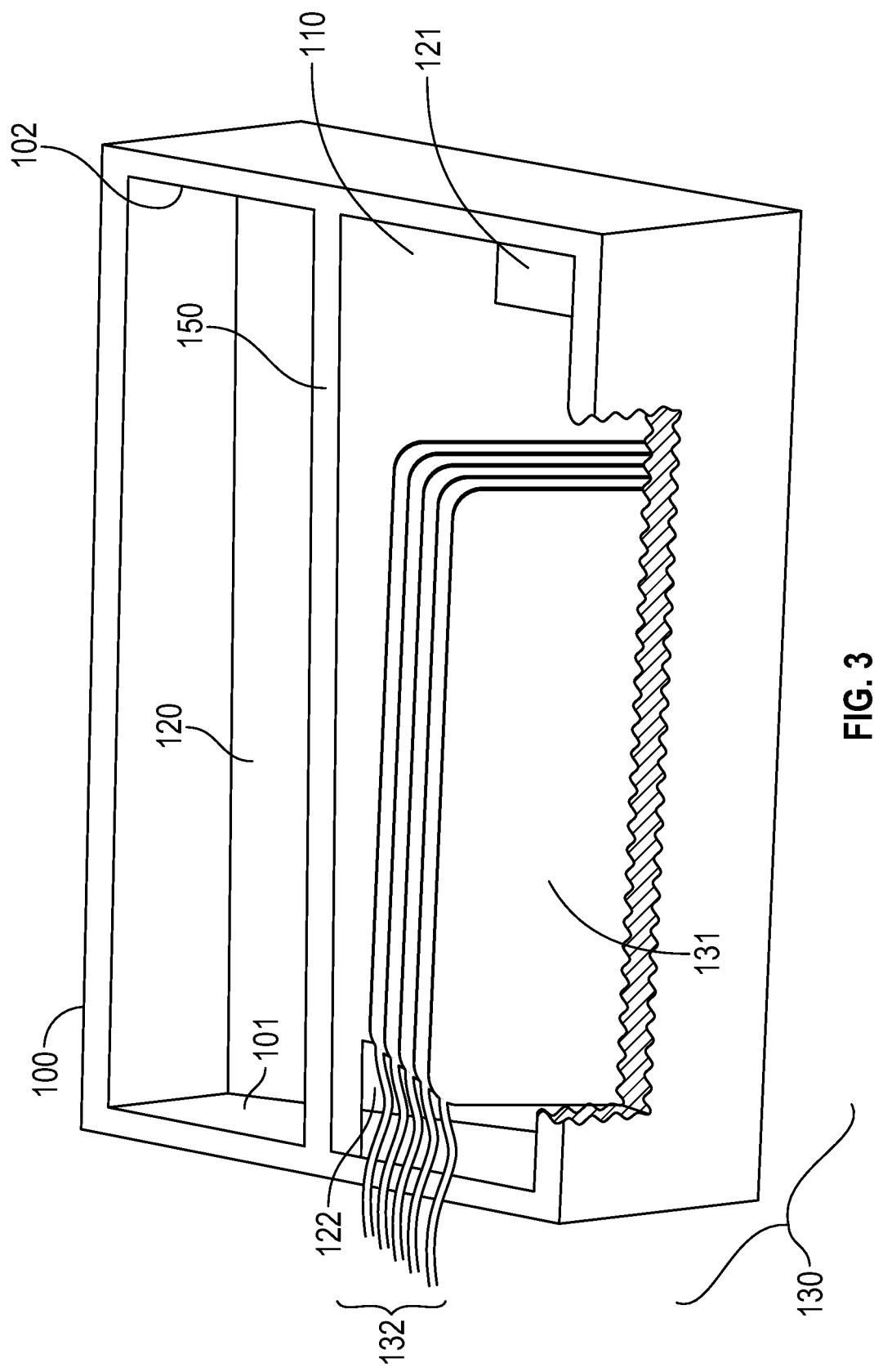
FIG. 3 is a view of a preservation container with a container lid and installed plurality of cooling plates in accordance with embodiments of the present disclosure.
Figure 4:
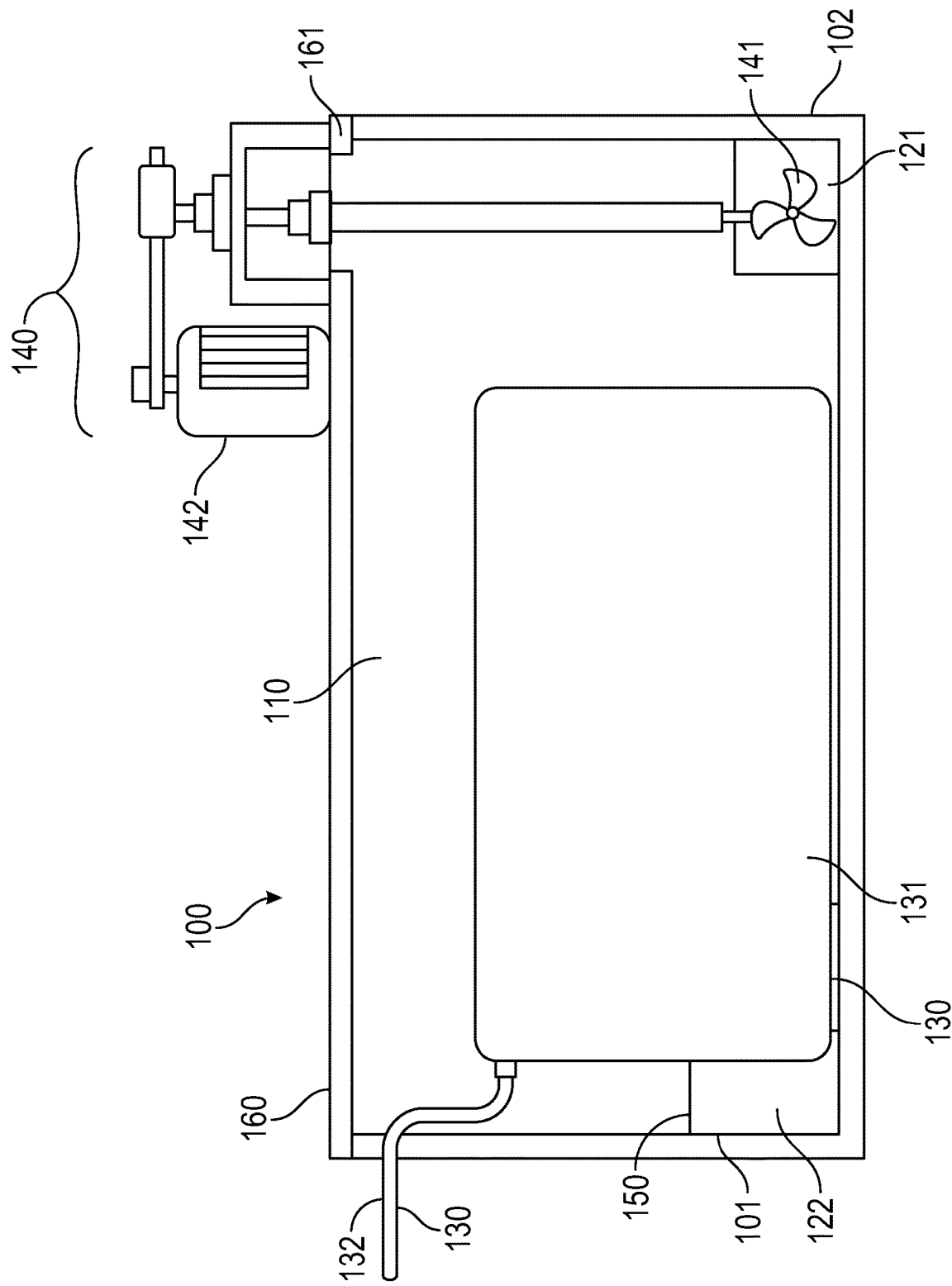
FIG. 4 is a view of a preservation container with a container lid and installed circulation system in accordance with embodiments of the present disclosure.
Figure 5:
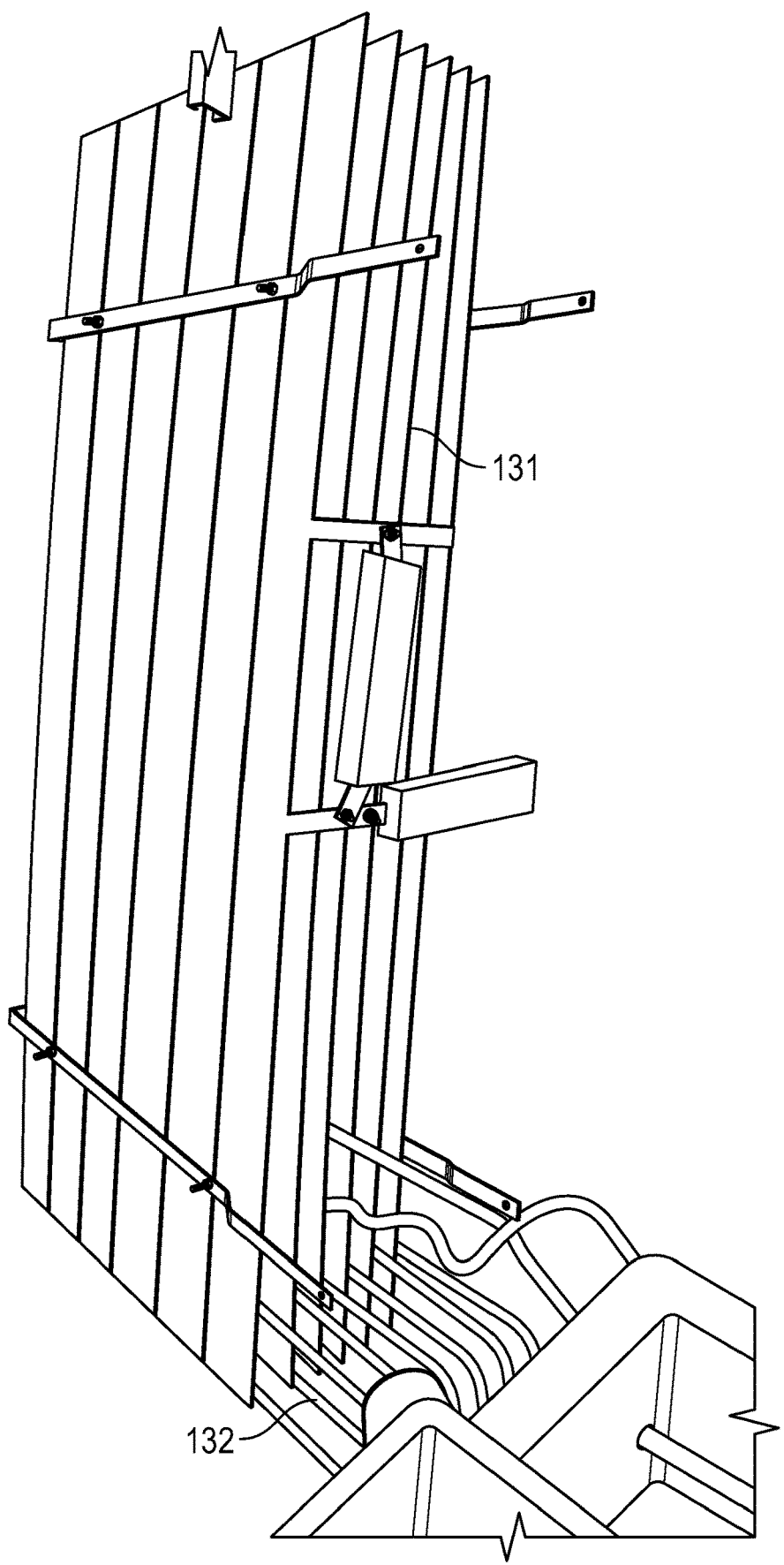
FIG. 5 is a view of a plurality of cooling plates in accordance with embodiments of the present disclosure.
Figure 6:
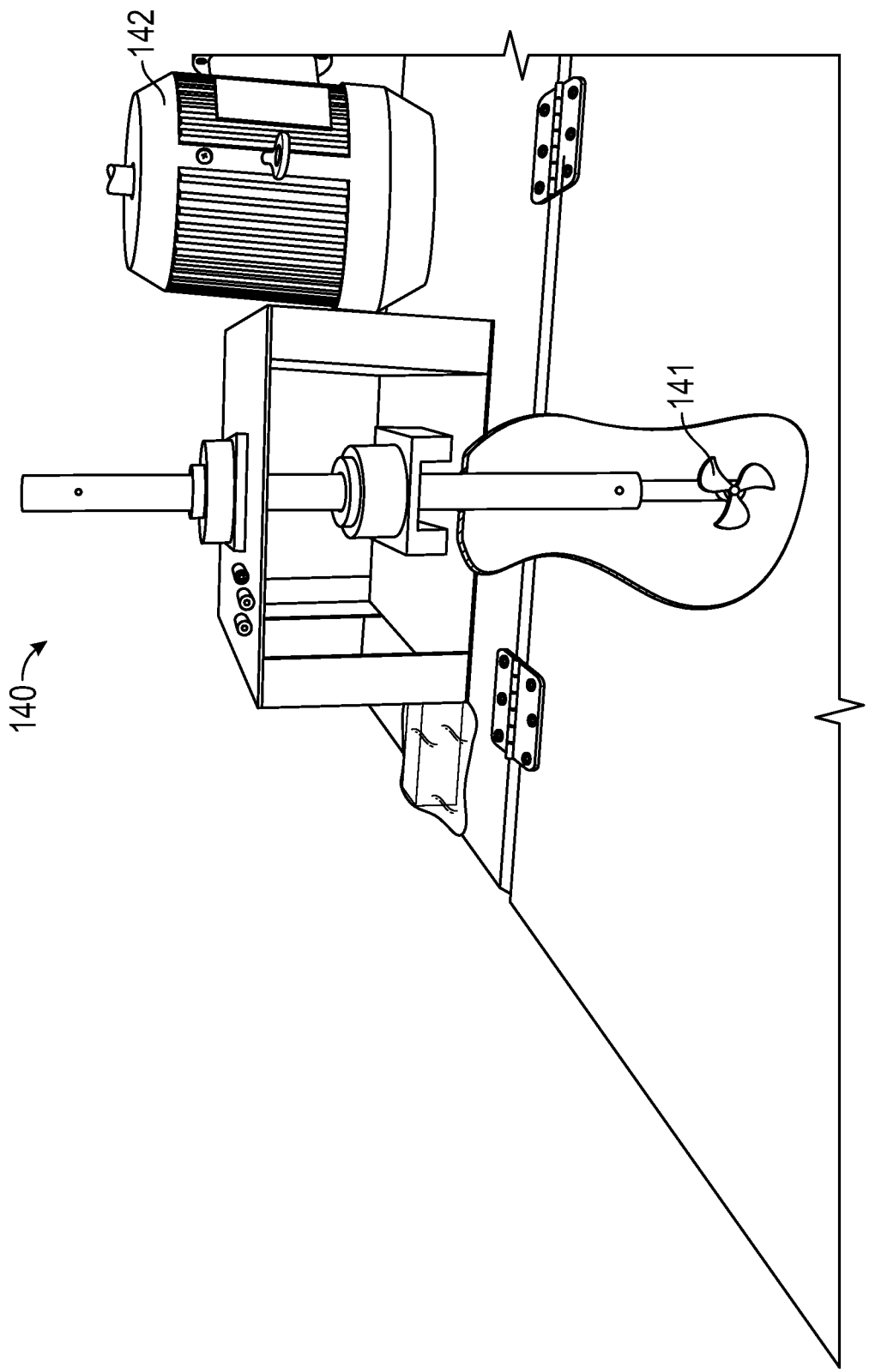
FIG. 6 is a view of a circulation system in accordance with embodiments of the present disclosure.
Figure 7:
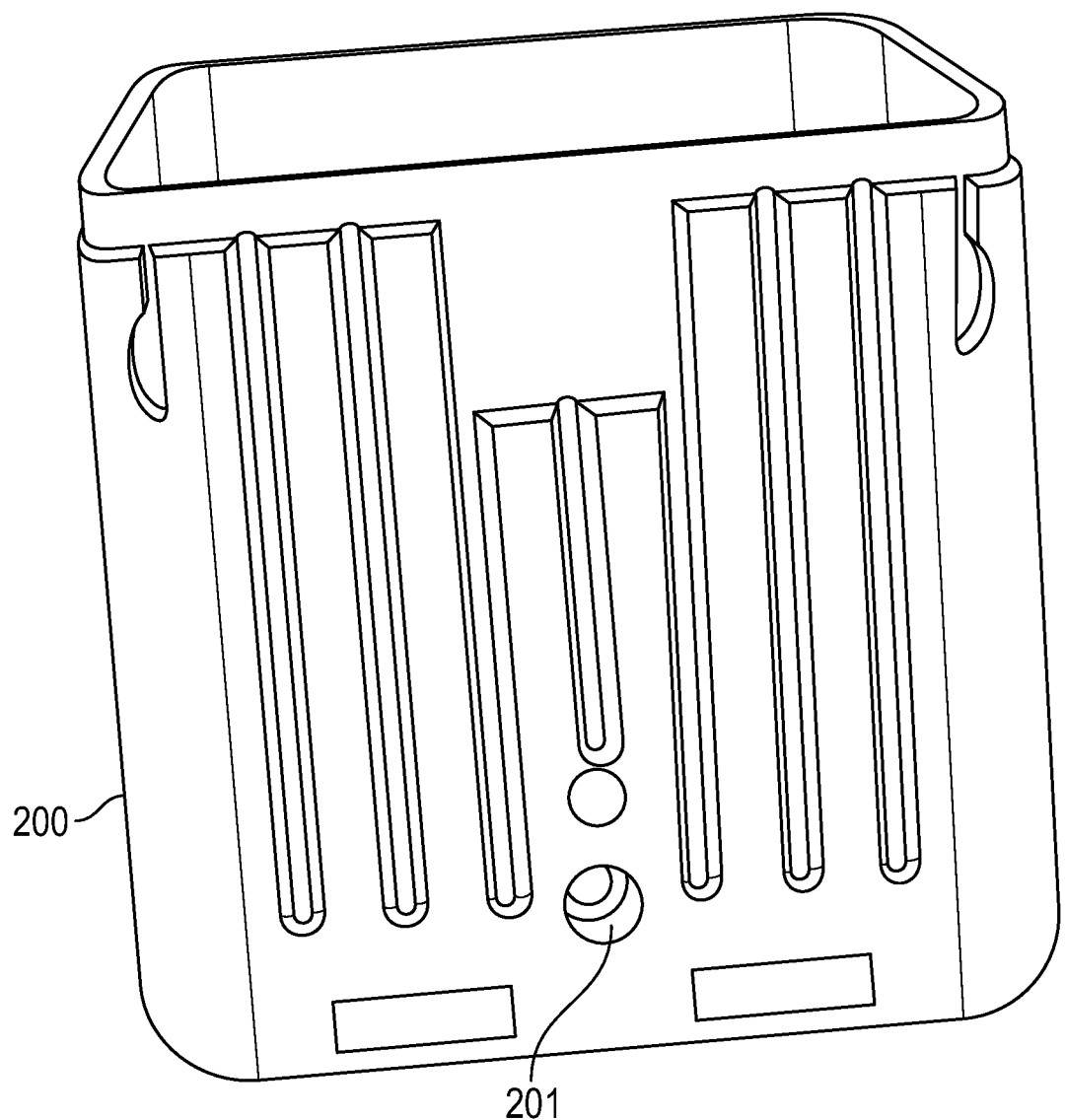
FIG. 7 is a view of a first wash receptacle in accordance with embodiments of the present disclosure.

Embodiments of the present invention further comprise a first wash receptacle, such as that depicted in FIG. 7, configured for cleaning and oxygenation of the crawfish. In such embodiments, said wash first receptacle may be a 300-500 gallon tank (or vat) 200 filled with salt water. Live crawfish are placed in that filled tank for approximately thirty (30) minutes to settle after which the water may be drained. If drained, the tanks are then refilled with salt water and a citrus concentrate solution is added to the tank to initiate crawfish cleaning. Additionally, or alternatively, baking soda may be added to the tank. In some embodiments, a second wash receptacle, configured similarly to the first, may be used for cleaning the crawfish in the citrus concentrate solution.

Other embodiments may further comprise an oxygenation system operationally coupled to the tank to oxygenate the crawfish held therein. Said oxygenation system comprises a diffuser, an oxygen bottle, and a regulator. When actuated, said oxygenation system saturates the liquid content of the tank with oxygen as said diffuser causes superfine oxygen bubbles to enter the tank. This results in excitation of the crawfish which expedites crawfish cleaning. Said oxygenation system may be coupled to the tank via an oxygenation port formed into the tank or otherwise arranged such that the diffuser causes oxygen to flow into the tank—such as directly into the open top of the tank.

Additionally, an agitation system may be operationally coupled to the tank to cause the contents of the tank to mix. Said agitation system comprises a water pump and a length of pipe to connect said water pump to the tank. The tank may be configured with at least one opening 201 to interface with said length of pipe. Said at least one opening 201 may be positioned near the lower portions of the walls of the tank thereby facilitating circulation of the liquid contents of the tank when said agitation system is actuated. The opening may be further configured to be partially obstructed thereby increasing the pressure of water entering the tank. This further expedites crawfish cleaning.

In these embodiments, the crawfish are cleaned in the tank for approximately thirty (30) minutes by the oxygenation and agitation systems after which the liquid contents of the tank are drained. The crawfish are then carefully netted onto a picking and sorting table. Sorting then occurs to remove any dead crawfish, weeds, baits, or anything else other than live crawfish (or other desired product). The remaining live crawfish may be optionally further sorted into groups based on size.

The resulting live, sorted crawfish are then placed back into the tank 200 to initiate preparation for freezing. Additionally, a different container, substantially similar in design and configuration to said first and second wash receptacles, may be used as a separate preparation receptacle rather than reusing said first or second wash receptacles. The use of different tanks may expedite the process and improve scalability.

The tank 200, or in certain embodiments said separate preparation receptacle, is filled with a low temperature fluid in order to reduce the temperature of crawfish contained therein. Said low temperature fluid can be a regular super ice slush water. Said regular super ice slush water may comprise a volume of water and a quantity of ice capable of lowering the temperature of the contents of the tank, or said separate preparation receptacle, to approximately 35 degrees Fahrenheit or other temperature that causes the tails of the crawfish contained therein to curl.

Said live, sorted crawfish are then placed on an elevator belt which carries said live, sorted crawfish to a bagging machine designed to place a quantity of said live, sorted crawfish into a bag. In certain embodiments, said quantity is between 1-40 lbs. In further embodiments, said quantity is between 20-25 lbs. Said bag may be specially sized, or otherwise configured, to contain said quantity in a manner that ensures that the crawfish contained in said bag are extremely tightly-packed thereby further preserving quality by avoiding spoilage or destruction (particularly breakage of claws and legs) of the crawfish that may otherwise occur. Using bags designed to support higher weights of crawfish results in damage to the crawfish due to decreased bag stability and increased weight being applied to the frozen crawfish contained therein thereby leading to broken appendages.

In certain embodiments, the crawfish may be weighed and bagged prior to being prepared for freezing. In such embodiments, crawfish are bagged after cleaning and oxygenation as described previously, and the bag is then placed in the tank with low temperature fluid.

Figure 8:
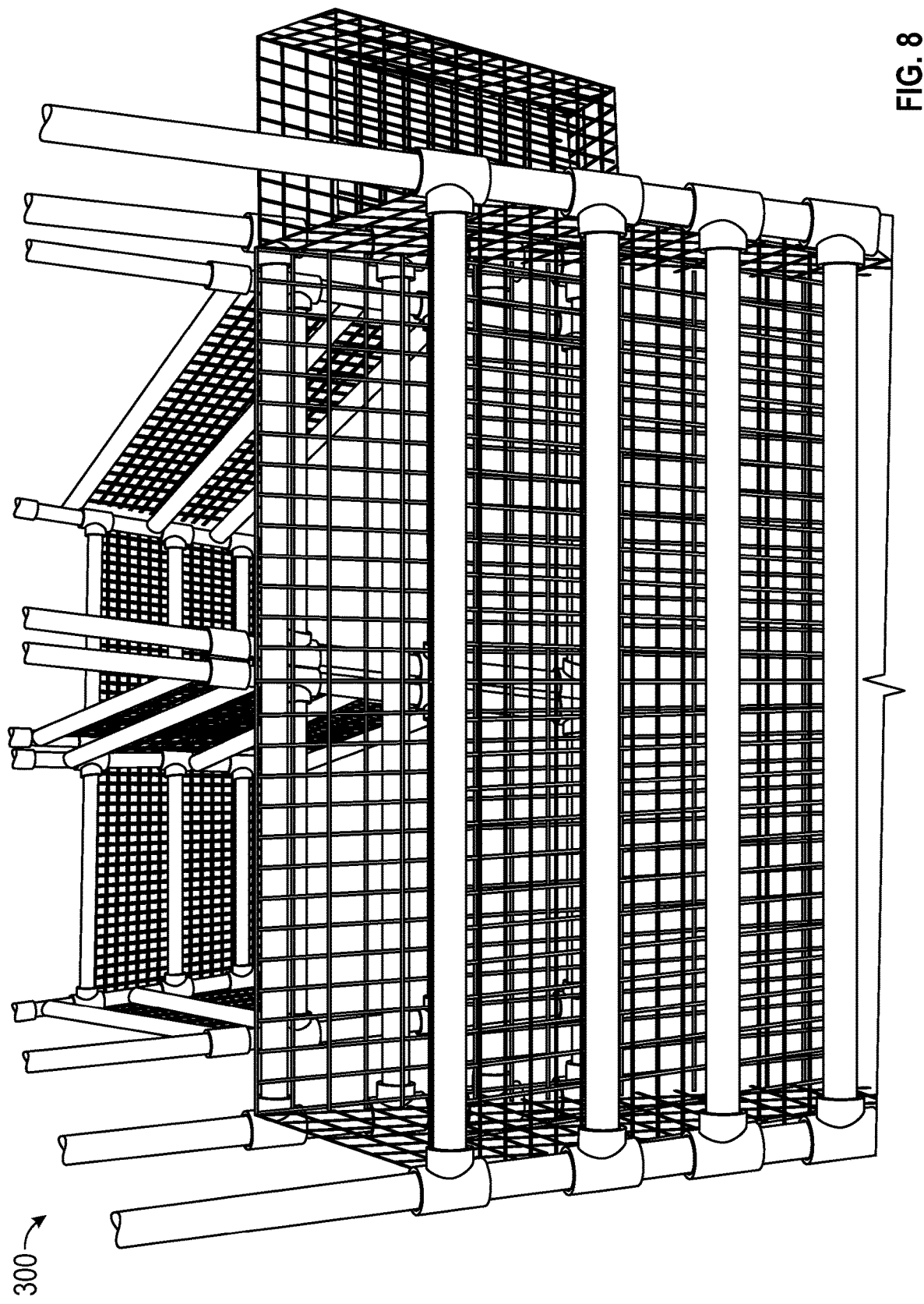
FIG. 8 is a view of a basket in accordance with embodiments of the present disclosure.
Figure 9:
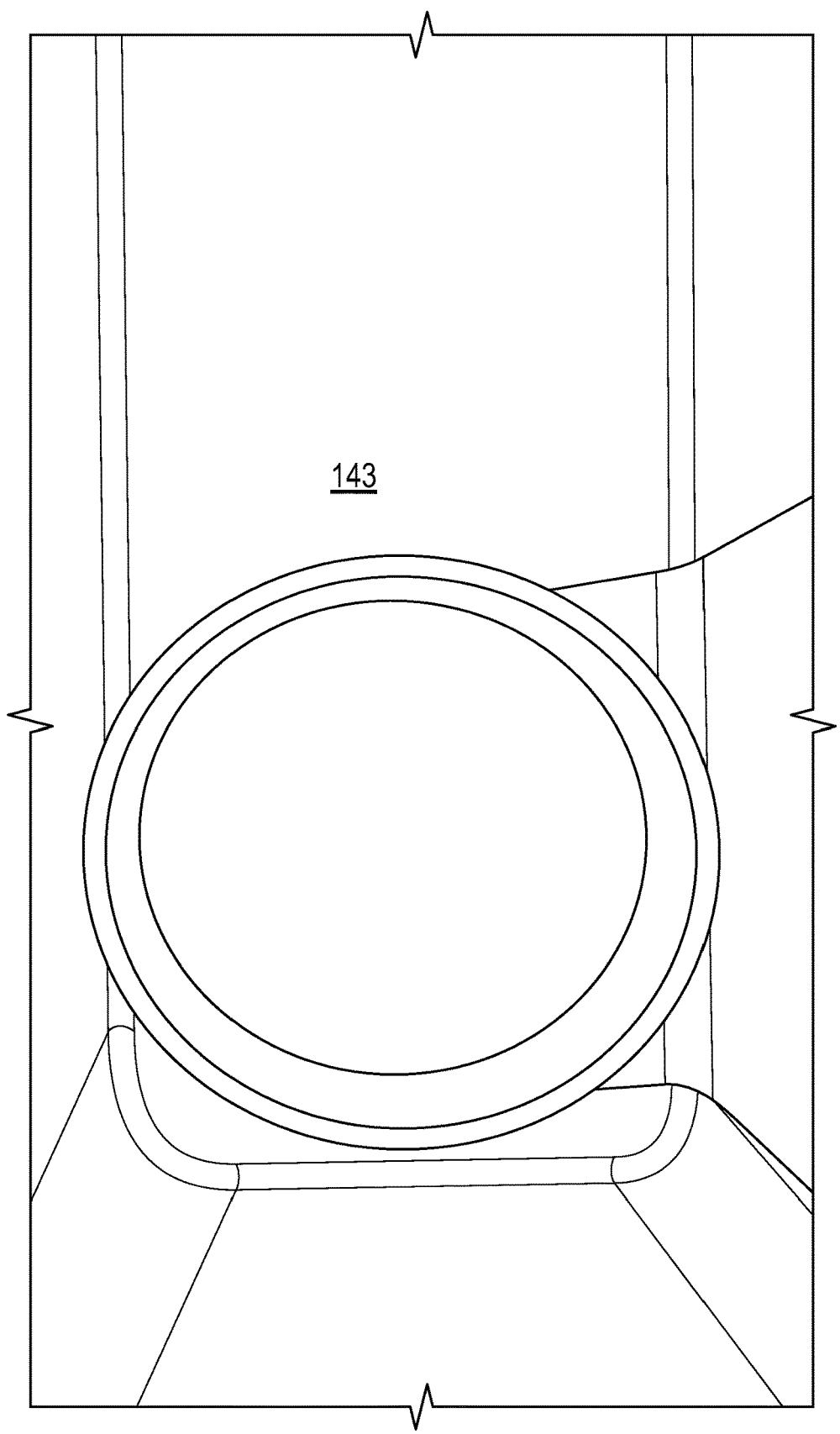
FIG. 9 is a top-down view of a rotational member guard assembly in accordance with embodiments of the present disclosure.

In various embodiments, whether crawfish are bagged before or after being prepared for freezing, said bag is then placed into a preservation container 100, such as that depicted in FIGS. 1-4, that is filled with a chilled preservation solution. Within said preservation container 100, the contents of said bag are further reduced in temperature. Said preservation solution may be a brine water solution. Said brine water solution may be chilled to, and effectively maintained at a temperature of, between −5 and −15 degrees Fahrenheit. In certain embodiments, said preservation solution may include sugar and/or Karo syrup to provide a glazing effect that improves long-term, shelf-life expectancy of the crawfish. Said bag is submerged in said chilled preservation solution for a submersion period until the temperature of the crawfish contained in said bag is below 32 degrees Fahrenheit. In a further embodiment, the temperature of the crawfish in said bag is reduced to 15 degrees Fahrenheit or below during said submersion period. In such an embodiment, said submersion period may be approximately 3-5 minutes. The speed of this process inhibits the formation of ice crystals in the crawfish that normally occurs during freezing. Said preservation container 100 may be operably coupled to a cooling system 130, such as that depicted in FIG. 3, (including a 15 ton compressor unit, or a 15 horsepower unit, in certain embodiments and at least one cooling surface, such as a large coil or other heat exchanger) to facilitate the further reduction of temperature. In some embodiments, said bag may be first placed in a basket 300, such as that depicted in FIG. 8, configured to fit within said preservation container 100 and to hold several such bags. Said basket 300 is further configured to allow fluid to flow through to any bags held therein.

In embodiments having a cooling system 130, said cooling system 130 may be configured to reduce the temperature of said preservation solution located in a first volume 110 of said preservation container that is separated from a second volume 120 of said preservation container by a divider wall 150 positioned in substantially the middle of said preservation container and running substantially along a length of said preservation container between a first container wall 101 and a second container wall 102. Said divider wall 150 substantially prevents fluid communication between said first volume 110 and said second volume 120 other than through a first opening 121 positioned at the bottom of said divider wall proximate said first container wall 101 and through a second opening 122 positioned at the bottom of said divider wall proximate said second container wall 102. In certain embodiments, said cooling system 130 may comprise a plurality of cooling plates 131 positioned in said first volume 110, wherein each plate of said plurality of cooling plates 131 is arranged such that a first plate surface of said each plate runs substantially parallel to said divider wall. The plates may secured to one another such that the first plate surfaces of each said plate are substantially parallel to one another with a space between each plate to allow for fluid to flow across the surfaces of the plates.

The cooling system 130 may further include a compressor unit, such as the unit described above, operably coupled to said plurality of cooling plates. The compressor is configured to cause a coolant (such as Freon) to flow through each plate of said plurality of cooling plates. The compressor may cause said coolant to flow through a pipe, or a plurality of pipes, 132 coupled between said compressor and said plurality of cooling plates. Optionally, said pipe, or each pipe of said plurality of pipes 132, may be configured with a valve to independently regulate the flow of said coolant through said pipe, or said each pipe. Said compressor unit is further configured to cause the temperature of said preservation solution to reach between −5 and −15 degrees Fahrenheit via said cooling plates 131. Said preservation solution may be caused to flow across and through said plurality of cooling plates 131 and to circulate between said first volume 110 and said second volume 120 of said preservation container thereby reducing the temperature of the crawfish in said bag. In such embodiments, said bag may be arranged in said second volume 120 of said preservation container. A grate, or a net or other mesh material, may be optionally disposed in said second volume 120 between said bag and said first opening 121 to reduce or avoid obstruction of said first opening. It would be recognized by those of skill in the art that coils or other heat exchangers, or other arrangements of plates, could be similarly employed to reduce the temperature of the preservation solution.

In certain embodiments, said preservation solution is caused to flow across and through said plurality of cooling plates by a circulation system 140. Said circulation system may include a motor 142 operably coupled to a rotational member 141 wherein the rotational member 141 rotates when the motor 142 is activated. Said rotational member 141 may be an auger or propeller that extends into said first volume 110 of said preservation container 100 without making contact with the base surface of said first volume 110. In these embodiments, the auger or propeller is disposed within said first volume 110 such that rotation of the auger or propeller causes preservation solution within said first volume 110 to flow through said first opening 121 into said second volume 120. Said preservation container 100 may also include a container lid 160 configured to fit across the top of said preservation container. A container lid opening 161 may be formed in said container lid substantially above said first volume 110 to allow the rotational member 141 of said circulation system 140 to extend vertically downward into said first volume 110 while the circulation system motor 142 remains outside of said first volume 110. The motor 142 may be configured to cause the rotational member 141 to rotate at such a speed that the preservation solution flows throughout said preservation container 100 at a rate of 400-600 gallons per minute.

Optionally, a rotational member guard assembly 143 may be disposed within said preservation container 100 to create a physical barrier between said rotational member 141 and said plurality of cooling plates 131. Said rotational member guard assembly 143 comprises a securing surface for reversible engagement with said divider wall 150 and a substantially cylindrical guard body having a volume configured to receive said rotational member 141. Said rotational member guard assembly 143 may be arranged in said preservation container 100 such that there is a distance between a preservation container floor surface and the bottom of said guard body in order to allow water to flow through the space created by said distance.

In certain embodiments, the preservation container 100 is a substantially rectangular tank having a length of approximately 10 feet and a width of approximately 5 feet.

When the target temperature for crawfish in said bag has been reached (approximately 15 degrees Fahrenheit in certain embodiments), said bag is carefully removed from said preservation container 100 and placed in a protective insulating material. For storage or transport of the preserved crawfish, the protected, insulated bag may be placed in a bubble wrap pouch. Said bubble wrap pouch may then be placed in at least a 5 mil plastic bag which may then be vacuum sealed. The sealed bag may be stored for up to 18 months in a freezer that maintains a temperature of 5 degrees Fahrenheit or lower.

Although the invention has been explained in relation to various embodiments thereof, it is to be understood that many other possible modifications and variations can be made without departing from the spirit and scope of the invention.

The invention claimed is:

1. A method for the long-term preservation of crustaceans comprising:
    filling a preservation container with a preservation solution, wherein the preservation container comprises a first inner volume and a second inner volume, wherein the second inner volume is sized to at least hold a 20 lb bag filled with crustaceans, wherein the first inner volume and the second inner volume are positioned side-by-side, in parallel, and separated by an inner dividing wall, the inner dividing wall configured to prevent fluid communication between the first inner volume and the second inner volume other than through a first opening and a second opening positioned at lower portions of the inner dividing wall, wherein the first opening is proximate to a first end of the inner dividing wall and the second opening is proximate to a second end of the inner dividing wall;
    submerging a quantity of crustaceans in said preservation solution within said second inner volume, wherein said preservation solution is caused to flow at a rate of at least approximately 400 gallons per minute;
    causing said preservation solution to maintain a target temperature, wherein said target temperature is maintained by a cooling assembly, said cooling assembly comprising a cooling element disposed within said first inner volume;
    causing said preservation solution to flow between said first inner volume and said second inner volume, wherein said preservation solution is caused to flow by a circulation assembly comprising an agitation member disposed within said first volume and a motor operationally coupled to said agitation member; and
    causing the internal temperature of said crustaceans to cool to at least 15 degrees Fahrenheit within 5 minutes of submerging said quantity of crustaceans in said preservation solution.

2. The method of claim 1 further comprising preparing said quantity of crustaceans in a preparation solution prior to submersion in said preservation solution, wherein said preparing causes said quantity of crustaceans to achieve a preparation temperature of approximately 35 degrees Fahrenheit.

3. The method of claim 2 further comprising removing said quantity of crustaceans from said preservation solution after said quantity of crustaceans reach a preservation temperature, and placing said quantity of crustaceans in an insulating material for long-term storage, wherein said long-term storage is for a period of at least eighteen months.

4. The method of claim 3 further comprising cleaning said quantity of crustaceans in a cleaning unit prior to submersion in said preservation vessel, wherein said cleaning unit comprises a tank and an agitation system, and wherein said quantity of crustaceans is placed within said tank for cleaning.

5. The method of claim 3 wherein said cooling element is a plurality of cooling plates, and wherein said cooling assembly further comprises a compressor configured to cause a coolant to flow through each cooling plate of said plurality of cooling plates.

6. The method of claim 5 wherein said target temperature is between approximately −5 and −15 degrees Fahrenheit.

7. The method of claim 5 wherein said quantity of crustaceans is a tightly-packed bag of crustaceans, said bag being configured to contain between approximately 20-25 lbs. of crustaceans.

8. The method of claim 1 wherein said first inner volume further comprises a basket configured to encompass said quantity of crustaceans, wherein said basket is further configured to allow fluid to flow through.

9. The method of claim 8 wherein said quantity of crustaceans is a tightly-packed bag of crustaceans, said bag being configured to contain between approximately 20-25 lbs. of crustaceans.

10. The method of claim 9 wherein said basket is configured to hold a plurality of said bags.

11. The method of claim 1, wherein the preservation container consists of a first volume and a second volume.

12. The method of claim 1, wherein the dividing wall is positioned in the middle of the preservation container.

13. The method of claim 1, wherein the cooling element is a plurality of cooling plates, and wherein the cooling assembly further comprises a compressor configured to cause a coolant to flow through each cooling plate of the plurality of cooling plates.

14. The method of claim 1, wherein the preservation container comprises a container lid above the first inner volume.

15. The method of claim 14, wherein the container lid comprises an opening above the first inner volume configured to allow the agitation member to extend vertically downward into the first inner volume and wherein the motor remains outside of the first inner volume.

16. The method of claim 1, wherein the preservation container comprises a container lid above the second inner volume.

17. The method of claim 1, wherein the first opening and the second opening are positioned at the bottom of the inner dividing wall.

* * * * *